United States Patent [19]
Bonfiglio

[11] 3,790,830
[45] Feb. 5, 1974

[54] MAGNET MOUNTING CLIP FOR A DYNAMOELECTRIC MACHINE

[75] Inventor: Charles P. Bonfiglio, Rochester, N.Y.

[73] Assignee: General Motors Corporation, Detroit, Mich.

[22] Filed: Aug. 9, 1972

[21] Appl. No.: 279,044

[52] U.S. Cl. .................................. 310/42, 310/154
[51] Int. Cl. ............................................ H02k 15/00
[58] Field of Search... 310/154, 155, 41, 42, 91, 310/254-258, 216, 71, 218, 89; 339/21, 27; 248/14, 27

[56] References Cited
UNITED STATES PATENTS

| | | | |
|---|---|---|---|
| 3,091,713 | 5/1963 | Latta | 310/154 |
| 2,971,107 | 2/1961 | Jin | 310/239 |
| 2,513,227 | 6/1950 | Wylie | 310/154 |
| 3,090,877 | 5/1963 | Baumhart | 310/154 |
| 2,456,701 | 12/1948 | Hansen | 310/154 |
| 3,521,096 | 7/1970 | Merriam | 310/154 |

FOREIGN PATENTS OR APPLICATIONS 923,477  6/1961  Great Britain ..................... 310/154

*Primary Examiner*—R. Skudy
*Attorney, Agent, or Firm*—W. A. Schuetz

[57] ABSTRACT

This disclosure relates to a magnet mounting clip for retaining arcuately shaped magnets within a cylindrical, annular housing of a dynamoelectric machine. The clip comprises a pair of deflectable bent end flanges positioned between the magnets and which are adapted to engage the respective end portions of the magnets to bias the magnets apart and into circumferential engagement with the inside of the housing. The clip also comprises a pair of end tabs on said bent end flanges and which are adapted to engage the respective opposite side portions of each magnet to retain the magnets in an axial relationship with each other within the housing. A key means or tab between the bent end flanges is also provided for cooperating with the housing to prevent circumferential and axial movement of the magnets relative to the housing.

2 Claims, 5 Drawing Figures

PATENTED FEB 5 1974

3,790,830

MAGNET MOUNTING CLIP FOR A DYNAMOELECTRIC MACHINE

The present invention relates to dynamoelectric machines and more particularly to clips for mounting permanent magnets within the housings of dynamoelectric machines.

Magnet mounting clips for dynamoelectric machines have heretofore been provided which are positioned between the respective end portions of the magnets of the machine and which serve to resiliently bias the magnets apart and into circumferential engagement with the housing in order to retain the magnets therein. For example, see U. S. Pat. Nos. 2,513,227; 3,090,877; and 3,258,622. Similarly, magnet mounting clips have heretofore been provided as described above and which further include radially disposed arms which engage the respective opposite sides of the magnets to retain them in an axial relationship with each other within the housing. For example, see U. S. Pat. No. 2,971,107. Further, magnet mounting clips as described above have heretofore been secured to the inside of the housing by conventional mechanical means, such as bolts. For example, see British Patent No. 923,477.

An object of the present invention is to provide a unitary magnet mounting clip which will circumferentially space and bias the magnets into circumferential engagement with the inside of a housing of a dynamoelectric machine, retain the magnets in an axial relationship with each other within the housing, and which will cooperate with the housing to prevent both circumferential and axial movement of the magnets relative to the housing.

Another object of the present invention is to provide a new and improved magnet mounting clip which retains arcuately shaped magnets within a cylindrical, annular housing of a dynamoelectric machine and which comprises a pair of deflectable bent end flanges positioned between the magnets and adapted to engage the facing end portions of the magnets to bias the magnets apart into circumferential engagement of the inside of the housing, a pair of end tabs on each of the bent end flanges which are adapted to engage the respective opposite side portions of each magnet to retain the magnets in axial relationship with each other within the housing, and an integral tab or key means between the bent end flanges for cooperating with grooves in the housing to prevent circumferential and axial movement of the magnets relative to the housing.

These and other objects of the invention are accomplished in a preferred embodiment of a dynamoelectric machine having a cylindrical, annular housing and a pair of arcuately shaped magnets positioned circumferentially within the housing, and magnet mounting clips having arcuately shaped base portions which are adapted to be positioned between the respective end portions of the magnets. The magnet mounting clips have deflectable bent flanges at the opposite ends of the base portions and which engage the facing end portions of the magnets to bias the magnets apart and into circumferential engagement with the inside of the housing. The clips also have pairs of deflectable end tabs at the opposite ends of each bent flange and which resiliently engage the opposite side portions of each magnet to retain the magnet in an axial relationship within the housing. Further, the clips have key projections or tabs which extend axially from the base portions between the bent flanges and which are positioned within key slots in the housing to prevent circumferential and axial movement of the magnets relative to the housing.

These and other objects of the present invention will become more fully apparent in the following detailed description and drawings wherein.

Figure 1:
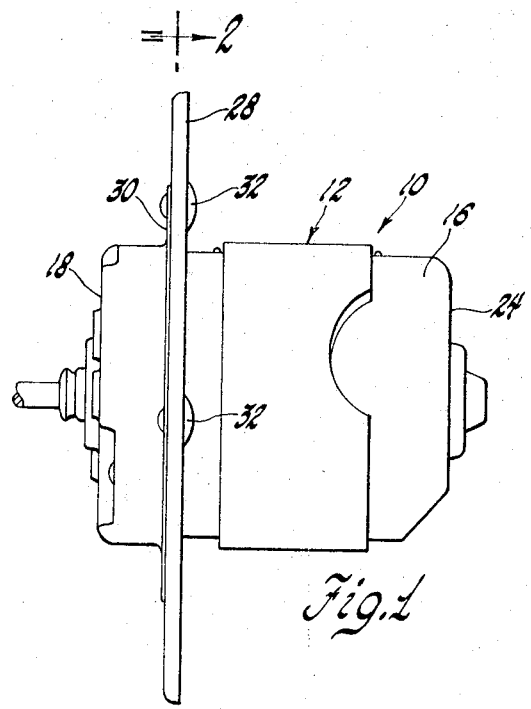
FIG. 1 is a front elevational view of a dynamoelectric machine.

As representing a preferred embodiment of the present invention, the drawings show a conventional dynamoelectric machine 10 which could be of any suitable variety having a housing 12, a pair of field magnets 14 positioned therein, and a pair of magnet mounting clips 15.

The housing 12 of the dynamoelectric machine 10 is a two-piece construction having a generally cylindrical hollow body portion 16 and a similarly shaped end plate 18. The body portion 16 has a cylindrical inner chamber 20 defined by its inner wall 22, an enclosed end 24, and an open end 26. The body portion 16 also includes a flange 28 which extends radially outwardly therefrom adjacent the open end 26. The end plate 18 also has a radially outwardly extending flange 30 which is adapted to abut the flange 28 of the body portion 16 and be mechanically fastened thereto by suitable mechanical means, herein shown as bolts 32, in order to retain the end plate 18 and the body portion 16 together.

The magnets 14, which are permanent and which can be of any suitable variety thereof, such as ceramic magnets, are arcuately shaped in a manner generally complementary with the inner wall 22 of the body portion 16 of the housing 12 and which in this manner, are adapted to be positioned in circumferential engagement against the inner wall 22 of the housing 12. The magnets 14 have, respectively, opposite end portions 34 and 34a, opposed side portions 36, arcuately shaped face sides 38, and arcuately shaped back sides 40 which are adapted to be positioned in circumferential engagement with the inner wall 22 of the housing 12.

The magnet mounting clips 15 of the present invention, which are adapted to retain the magnets 14 both circumferentially and axially within the housing 12, each broadly comprise a base portion 41, a pair of bent end flanges 42, pairs of end tabs 44 at the ends of the end flanges 42, and a key projection or tab 46.

Figure 5:
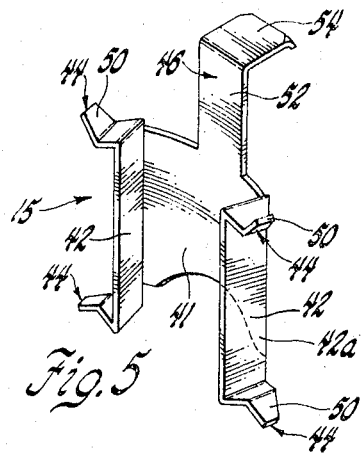
FIG. 5 is a perspective view of the magnet mounting clip of the present invention.
Figure 4:
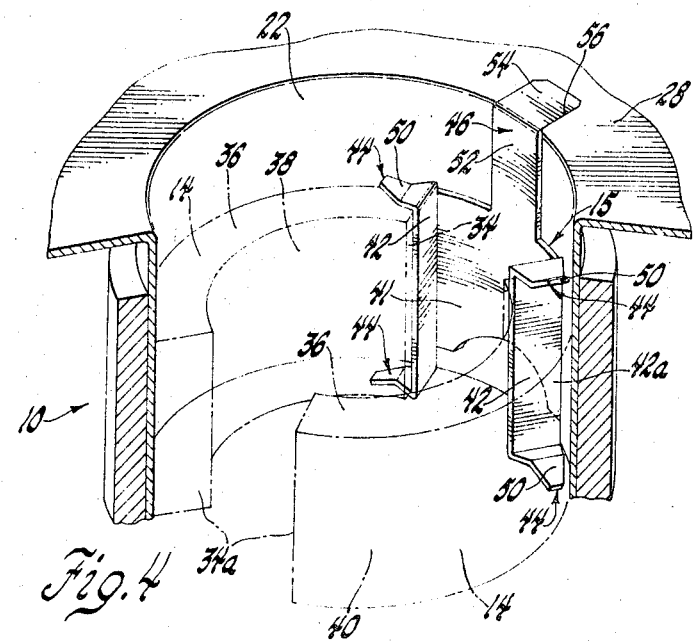
FIG. 4 is a fragmentary, perspective view of a dynamoelectric machine embodying the present invention.

Referring to FIGS. 4 and 5, the base portion 41 of each magnet mounting clip 15 is arcuately shaped in a manner generally complementary with the inner wall 22 of the housing 12 and is adapted to be positioned in engagement with the inner wall 22 of the housing 12 between the facing end portions 34 of the magnets 14, as will later be described in more detail.

Figure 2:
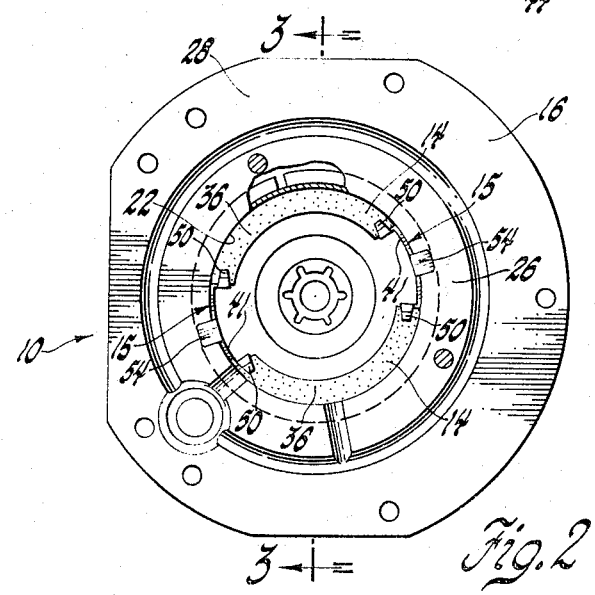
FIG. 2 is a cross-sectional view taken along line 2—2 in FIG. 1.
Figure 3:
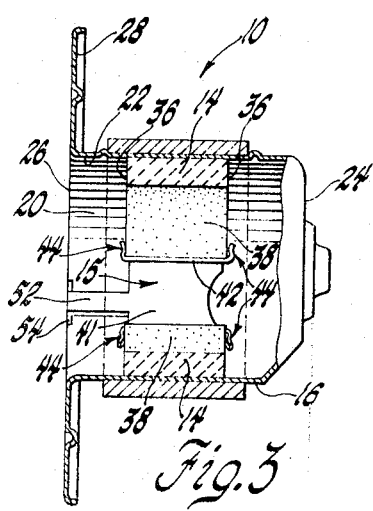
FIG. 3 is a cross-sectional view taken along line 3—3 in FIG. 2.

The pair of bent end flanges 42 of each clip 15 are formed into a generally perpendicular or normal relationship with the base portion 41 at the opposite ends thereof and, as shown in FIGS. 2 - 4, extend radially inwardly with respect to the housing 12 when the clips 15 are assembled therein, as will later be described in more detail.

The pairs of end tabs 44 are formed at the opposite ends of each bent end flange 42. Further, the pairs of end tabs 44 are formed with first portions bent inwardly toward each other and thereby assuming an acute angular relationship with the outer faces 42a of the bent flanges 42. The pair of end tabs 44 also include second portions 50 which are bent outwardly away from each other. Further, the pairs of end tabs 44 are spaced apart a distance less than the dimension between the opposed side portions 36 of each magnet 14 in order that they may be resiliently engaged therewith upon assembly, as will later be described in more detail.

The key projection 46 of each clip 15 has a first portion 52 which extends outwardly from the base portion 41 and which assumes an axially extending relationship with the housing 12 when the clips 15 have been assembled therewith, as shown in FIGS. 3 and 4. Each key projection 46 also includes a second portion 54 which is formed in a perpendicular or normal relationship with the first portion 52 and which assumes a radially outwardly extending relationship to the housing 12 when the clips 15 are assembled therewith, also as shown in FIGS. 3 and 4.

With reference to FIGS. 2 - 4, it should be seen that the magnet mounting clips 15 during assembly of the machine 10 are forceably received between the facing end portions 34 of the two magnets 14. As the clips 15 are forced between the magnets 14, the pairs of bent end flanges 42 engage and are deflected toward each other by the facing end portions 34 and 34a of the two magnets 14. Similarly, as the clips 15 are forceably received between the two magnets 14, the pairs of end tabs 44 are engaged and deflected apart by the opposite side portions 36 of the magnets 14. Further, the second portions 54 of the key projections 46 are received within radially outwardly, circumferentially spaced key slots or grooves 56 in the radial flange 28 of the housing 12. Thus, it should be understood that the bent end flanges 42 serve to resiliently bias the magnets 14 apart and into circumferential engagement with the inner wall 22 of the housing 12, the pairs of end tabs resiliently engage the opposed side portions 36 of the magnet 14 and retain the magnets 14 in an axial relationship with one another in the housing 12, and that the positioning of the key projections 46 within the key slots 56 serves to prevent relative circumferential and axial movement of the magnets 14 relative to the housing 12.

The foregoing disclosure relates to a preferred embodiment of the subject invention which may be modified within the scope of the appended claims.

What is claimed is:

1. In a dynamoelectric machine having a cylindrical, hollow housing and a plurality of arcuately shaped magnets having end and side portions and positioned circumferentially within the housing, the improvement comprising: a plurality magnet mounting clips having arcuately shaped base portions, each of said mounting clips being adapted to be positioned between adjacent end portions of adjacently located magnets, deflectable bent flanges at the opposite ends of said base portions which face and engage the end portions of the magnets to bias the magnets apart and into circumferential engagement with the inside of the housing, pairs of deflectable end tabs at the opposite ends of each bent flange for resiliently engaging the opposite side portions of each magnet to retain the magnets in an axial relationship within the housing, and key projections having a first portion extending axially from said base portions and a second portion extending radially outwardly from the base portion and positioned within key slots in the housing to prevent circumferential and axial movement of the magnets relative to the housing.

2. In a dynamoelectric machine, the combination comprising: a cylindrical, hollow housing having two members which are axially abutted and define a pair of outwardly radially extending key slots at circumferentially opposed positions; a pair of arcuately shaped magnets having end and side portions positioned circumferentially within said housing; and a pair of magnet mounting clips each having an arcuately shaped base portion adapted to be positioned between the respective end portions of said magnets and to abut the inside of said housing, a pair of deflectable bent flanges extending radially inwardly from the opposite ends of said base portions of each of said mounting clips and engaging the facing end portions of said magnets and biasing said magnets apart and into circumferential engagement with the inside of said housing; pairs of deflectable tabs at the opposite ends of each of said bent flanges and resiliently engaging the opposite side portions of each of said magnets to retain said magnets in an axial relationship with each other within the housing, and a key projection extending axially from each of said base portions and being bent radially outwardly and received within said key slots of said housing to prevent circumferential movement of said magnets relative to said housing and also to prevent axial movement of said magnets relative to said housing.

* * * * *